Sept. 29, 1970  J. R. CHESEMORE  3,531,581

ELECTRICAL ASSEMBLY AND TERMINAL LEAD CONSTRUCTION

Filed March 11, 1968  4 Sheets-Sheet 1

INVENTOR.
JAMES R. CHESEMORE
BY
ATTORNEY

Sept. 29, 1970 J. R. CHESEMORE 3,531,581
ELECTRICAL ASSEMBLY AND TERMINAL LEAD CONSTRUCTION
Filed March 11, 1968 4 Sheets-Sheet 2

INVENTOR.
JAMES R. CHESEMORE
BY
*Ferd L Mehlhoff*
ATTORNEY

Sept. 29, 1970     J. R. CHESEMORE     3,531,581

ELECTRICAL ASSEMBLY AND TERMINAL LEAD CONSTRUCTION

Filed March 11, 1968     4 Sheets-Sheet 3

INVENTOR.
JAMES R. CHESEMORE
BY
*Gerd L. Mehlhoff*
ATTORNEY

Sept. 29, 1970  J. R. CHESEMORE  3,531,581
ELECTRICAL ASSEMBLY AND TERMINAL LEAD CONSTRUCTION
Filed March 11, 1968  4 Sheets-Sheet 4

INVENTOR.
JAMES R. CHESEMORE
BY
ATTORNEY

United States Patent Office 3,531,581
Patented Sept. 29, 1970

3,531,581
ELECTRICAL ASSEMBLY AND TERMINAL LEAD CONSTRUCTION
James R. Chesemore, Orange, Calif., assignor to Beckman Instruments, Inc., a corporation of California
Filed Mar. 11, 1968, Ser. No. 712,230
Int. Cl. H05k 1/04
U.S. Cl. 174—68.5
17 Claims

ABSTRACT OF THE DISCLOSURE

An electrical assembly formed of a nonconductive base member adapted to receive and support a variety of electrical components on at least one surface thereof and including at least one terminal pin attached within a slot formed in an edge of the base member. The terminal pin is provided with a pin section and a head section, the head section being upset within the slot to provide a positive mechanical interference fit between the sides of the slot and the head section with the pin section protruding outwardly from the base member for connecting the device into an electrical circuit.

---

This invention is particularly applicable to electrical circuit devices such as electrical circuit boards, and microcircuit networks deposited on a ceramic or plastic wafer. The surface of the base member or wafer has deposited thereon an electrical network formed of an electrically conductive material and may also include various deposited or discrete components, such as capacitors, resistors and transistor devices which are electrically connected into the deposited electrical network. The device requires some means for electrically connecting the electrical network into external sources of power or for electrically connecting it with other electrical apparatus. In micromodule technology, various termination arrangements have been employed in the past, such as lead wires soldered to the deposited layer material. Since this layer of material is, in most cases, extremely thin it is difficult to obtain a good strong bond between the terminal member and the conductive layer. In the past, attempts have been made to reinforce these conductive layers by adding additional solder material, but this method is difficult to control and sometimes results in overlapping of the adjacent conductive circuitry. Without a strong bond, it is easy for the leads to become separated from the circuit element during handling and use thereof.

When it is understood that the size of the microminiature circuit modules may be less than one square inch and that the base member on which the materials are deposited may be less than ⅛ inch in thickness, the problems associated with the attachment of terminal leads can well be appreciated.

It is, therefore, an object of the present invention to provide an improved terminal lead structure for an electrical assembly which is extremely rugged yet very simple and easily attached to the base member of the assembly.

It is another object of the invention to provide an improved method of assembly for attaching a terminal lead to an electrical network supported on a thin nonconductive base member.

Further objects and advantages of the invention will become apparent as the following description proceeds and the features of novelty which characterize the invention will be pointed out with particularity in the claims annexed to and forming a part of the specification.

For a better understanding of the invention, reference may be had to the accompanying drawings in which.

Figure 12:
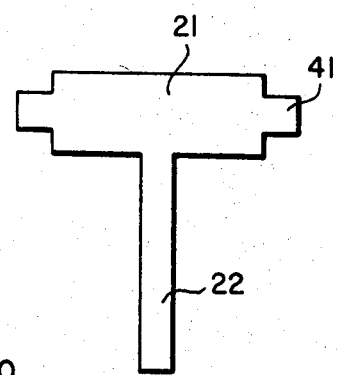
FIG. 12 is a plan view of still another embodiment of a terminal member.
Figure 15:
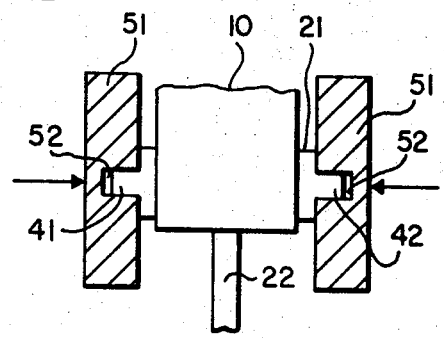
Figure 16:
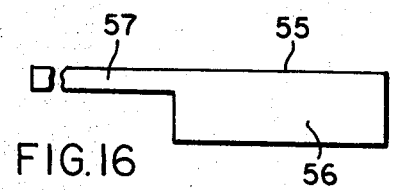
Figure 17:
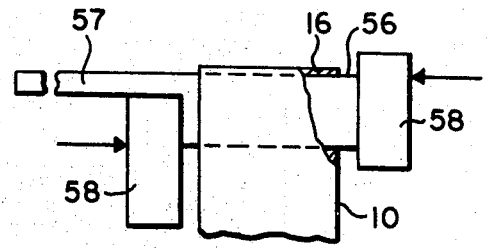
Figure 18:
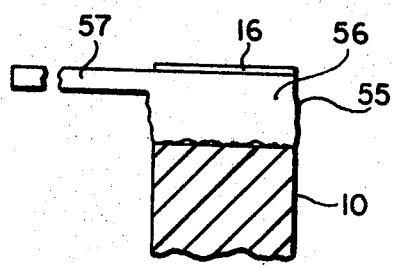
Figure 19:
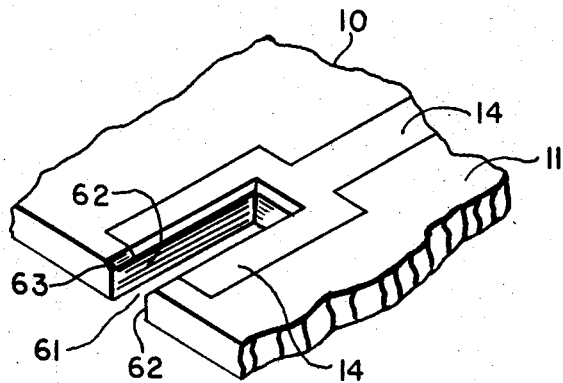

FIG. 15 schematically illustrates the upsetting of a terminal member such as that shown in FIG. 12 assembled therein;

FIG. 16 illustrates still another terminal member having a pin section thereof protruding outwardly substantially along the elongated axis of the head section of the terminal member;

FIG. 17 illustrates, in schematic form, the upsetting of the terminal of the type illustrated in FIG. 16 within the slot of a base member;

FIG. 18 is a partial cross-sectional view of an assembled base member showing the terminal member of FIG. 16; and FIG. 19 is an enlarged end view of a slot having parallel sides formed within the edge of a base member.

Figure 1:
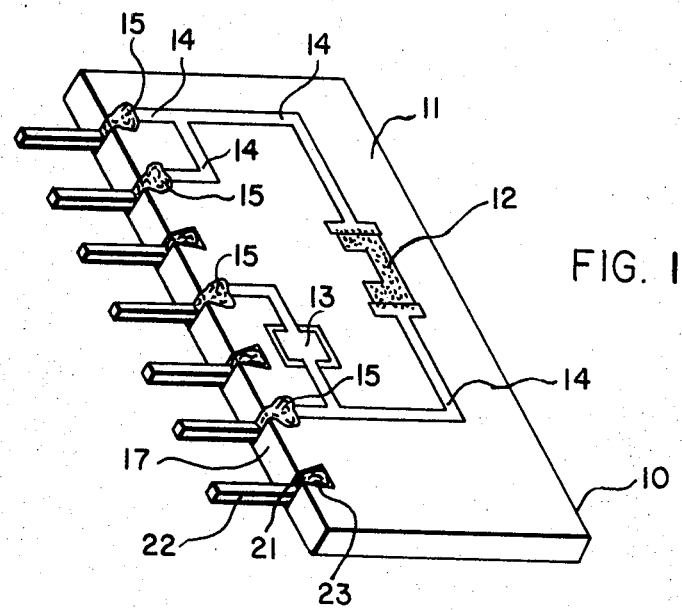
FIG. 1 is a perspective view of a nonconductive base member in the form of a thin wafer supporting an electrical network.

Referring now to FIG. 1, there is shown an enlarged view of a microminiature circuit element including a suitable nonconductive base member or substrate 10 having deposited on a flat surface 11 thereof a resistance element 12 and a capacitor element 13 which are in turn connected by a network of electrically conductive material 14 also deposited on the surface of the base member. The electrically conductive film pattern or network provides an electrical path connecting the various electrical devices and may be formed in any desired arrangement required for the desired electrical function to be attained. The circuit elements, such as the resistor 12 and the capacitor 13 shown attached to the illustrated base member 10, are merely exemplary of the type of electrical components that are commonly employed in microcircuit devices and it should be understood that other conductive electrical networks and elements, such as transistors and diodes may also be employed. The microcircuit module illustrated in FIG. 1, discloses only one embodiment of a microcircuit device and it will be understood that there is no intention to limit the invention to the particular circuitry disclosed. On the contrary, as will be hereinafter described the terminal structure and method of assembly is broadly applicable to various types of electrical devices regardless of the network pattern or electrical components attached to the base.

Figure 2:
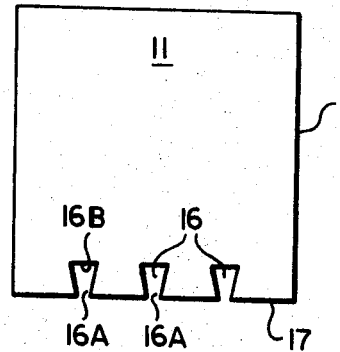
FIG. 2 is a plan view of a substrate base member illustrating a preferred shape for the terminal pin slot formed in an edge thereof.

The substrate member may be formed of any suitable nonconductive material, such as a plastic material, or a high temperature resistance ceramic material of alumina, steatite, or other nonconductive material well-known in the art. As may be seen by reference to FIG. 2, the base member is provided with a plurality of dove-tailed slots 16 along an edge 17 thereof. In the preferred embodiment of the invention, the slots extend through the entire thickness of the base 10 and communicate with the surfaces on opposite sides of the substrate base member 10. Each slot is preferably formed narrow at its opening 16A along the edge 17 of the base member with the side walls of the slot diverging toward the rear surface or bottom 16B thereof. As will be seen in FIGS. 1 and 5, portions of the conductive pattern 14 are deposited adjacent the edges of the slots 16 and, as may be seen in FIG. 5, this conductive material may actually surround a portion of the respective slot.

Figure 3:
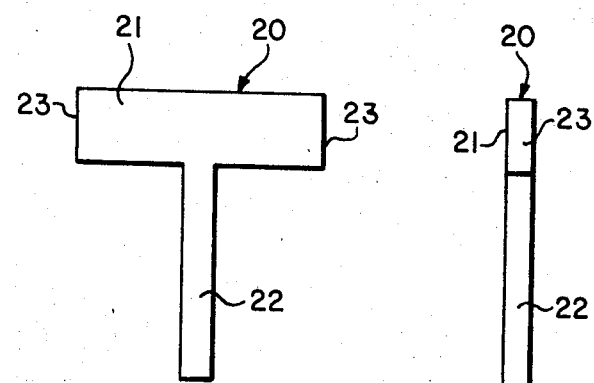
FIG. 3 is an enlarged plan view of a terminal member.
Figure 4:
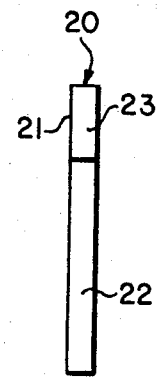
FIG. 4 is an enlarged side view of the terminal member of FIG. 3.

Referring now to FIGS. 3 and 4, there is shown a T shaped terminal 20 which includes a head section 21, comprising the cross of the T, and an outwardly extending pin section 22. The terminal member 20 may be stamped or otherwise fabricated of conductive material such as copper, brass, or other conductive malleable material.

Figure 5:
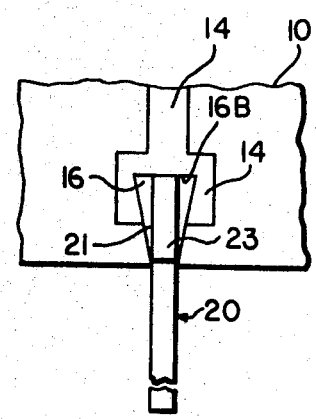
FIG. 5 is a greatly enlarged partial view of a base member having a terminal member assembled within a slot thereof.
Figure 6:
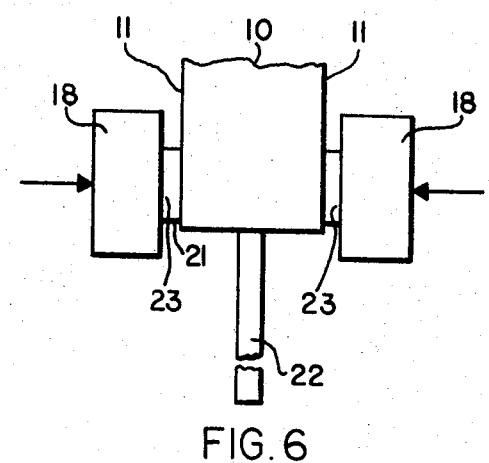
FIG. 6 is an enlarged side view of the base member and terminal assembly and schematically illustrating the method of upsetting the head section of the terminal member within a slot of the base member.

As will be seen in FIGS. 5 and 6, the terminal 20 is positioned with the head section 21 within a slot 16 formed in the base member 10 and with the end portions 23 protruding out opposite sides of the base member. Note that the width or thickness of the terminal is such that it slides easily into the slot 16 and the head section 20 abuts against the back 16B of the slot 16.

As will be understood by reference to FIG. 6, the mounting or head section 21 is upset or otherwise deformed in place within the slot 16 by an appropriate tool or press 18 which applies a force against each end 23 of the head section of the terminal member. The head section is made thicker or otherwise deformed in place by this upsetting operation so that the sides thereof expand against the sides of the slot 16 and produce a positive mechanical interference fit with the sides of the slot.

Figure 7:
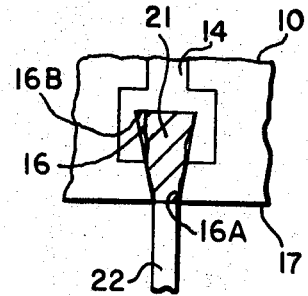
FIG. 7 is a view similar to that of FIG. 5 showing a cross-section of the head section of the terminal member after being upset with a slot of the base member.

As will be seen in FIG. 7, when the head section 21 of the terminal member is upset within the slot it substantially fills the voids therein and cannot be pulled out through the front opening 16A of the slot. Also, the sides of the upset head section 21 bind with the sides of the slot and prevent the terminal from being dislodged by a force normal to the surfaces of the base. While it is preferable to have the head section of the terminal thickened or "upset" by the forces applied to opposite ends thereof, it is also possible to securely retain the head section within the slot by deforming it or causing it to form bends within the dove-tail slot so that the sides of the head section engage the sides of the slot and support the terminal member therein. Therefore, as used hereinafter in this specification and in the claims annexed hereto, the terminology "upset" or "upset and made thicker" is meant to apply to either or both of the structural changes wherein the head section 21 of the terminal member is caused to become thickened within the slot or is so deformed within the slot that it engages the sides thereof and becomes mechanically bound therein.

Figure 8:
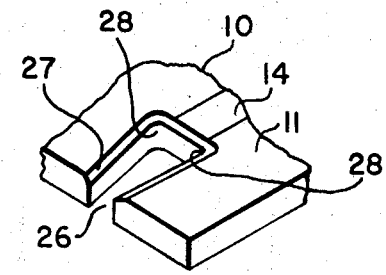
FIG. 8 is an enlarged perspective view illustrating a slot in the substrate having a countersunk or relieved portion formed thereon.

Referring now to FIG. 8, there is shown a wedge or dove-tailed groove 26 having a beveled edge 27. In this embodiment the back of the groove has rounded corners 28 and the conductive material 14 is deposited over the edges of the beveled portion of the groove. When a terminal pin, such as the pin illustrated in FIG. 3, is upset within the groove 26, portions of the head section of the pin are upset and flattened into the beveled portion of the groove to make contact with the conductive material 14. By having the groove, beveled or undercut, the flattened portions of the head section of the terminal are made flush with the surface 11 of the base member 10. The purpose of the undercut or beveled portion of the groove is to permit the overflow material from the head section to spread into the undercut portions of the groove rather than forming a bulge or hump in the region of the terminal pin.

Figure 10:
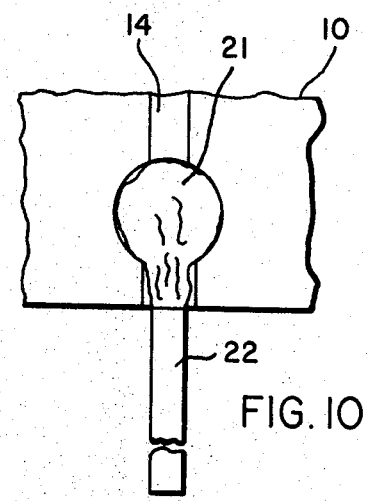
FIG. 10 is an enlarged plan view showing a terminal pin upset within the key hole shaped slot of FIG. 9.
Figure 9:
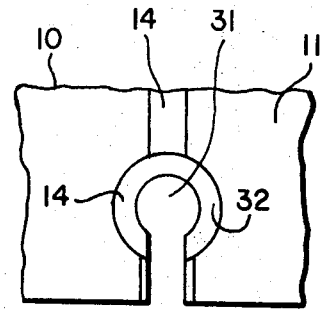
FIG. 9 is a plan view illustrating a key hole shaped slot having a countersunk portion associated therewith.

Note in FIG. 9, another embodiment of the invention in which the groove 31 takes the form of a key-hole shaped groove and is provided with an undercut or beveled portion 32 around the outer edges of the groove and the surface of the base member. The conductive material 14 is deposited, as in previous embodiments, so that a portion thereof becomes bonded to the beveled portion 32 of the groove. As in the embodiment of FIG. 8, when the terminal pin or head section 21 of the pin is inserted in the slot and upset therein the ends of the pin are flattened into the beveled portion 32 of the groove, as illustrated in FIG. 10. In this embodiment, the head section 21 has been upset in the slot 31 with the pin section 22 extending out the opening of the slot. The ends of the headed section 21 of the pin have been smashed or deformed so that they make contact with the beveled section 32 of the slot and provide an electrical connection with the conductive material 14 deposited on the beveled surface. The surface of the base member 10 and the upper surface of the upset pin 21 are substantially flush.

Figure 11:
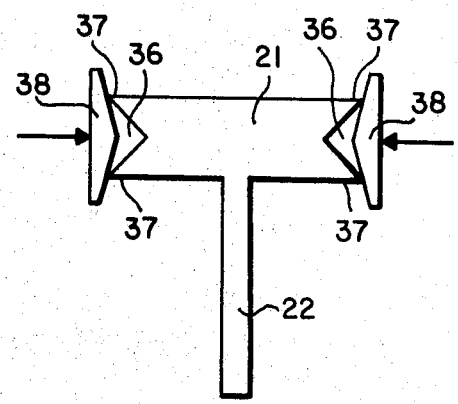
FIG. 11 is a plan view of another embodiment of a terminal member and schematically illustrating the mechanism for upsetting this terminal member.

FIG. 11 illustrates another embodiment of the terminal member in which the ends of the head section are so formed that they may be bent over or otherwise deformed to make contact with the edges of the base member and the conductive material deposited thereon. This embodiment is particularly useful when employed with grooves, such as those of FIGS. 8 and 9 in which the slots are provided with the relieved or beveled section around the edge thereof adjacent the surface 11 of the base. In this embodiment (FIG. 11) the ends of the head section 21 are formed with notches 36 to produce wing tips 37 that may be displaced outwardly adjacent the top surface 11 of the base member or displaced outwardly into a relieved or beveled section of a slot when the head section of the terminal is upset by a force applied by opposed pressure plates 38. The opposed pressure plates, in this embodiment, may have surfaces slanted outwardly to engage the wing tips 37 of the head section 21 of the terminal to force them outward as the pressure is applied against the opposite ends of the head section. It is not absolutely essential however, that the pressure plates be formed in this manner, as the effect of a flat surface against the wing tips 37 also tends to force them outwardly during the deformation or upsetting step.

Figure 13:
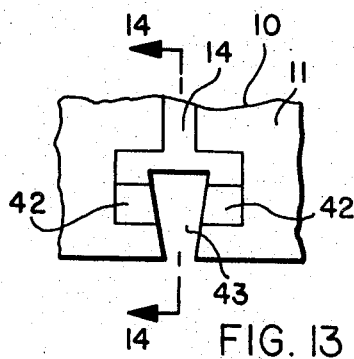
FIG. 13 is a plan view of a substrate base member having a substantially triangular shaped slot with relieved sections adapted to receive upset end portions of a terminal member such as that illustrated in FIG. 12.
Figure 14:
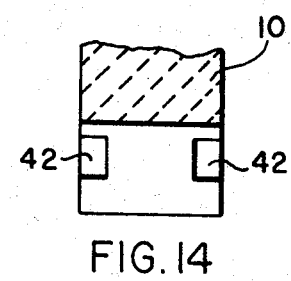
FIG. 14 is a cross-sectional view taken substantially along lines 14—14 of FIG. 13.

FIG. 12 illustrates still another embodiment of the invention in which the head section 21 is provided with tabs 41 extending outwardly from the ends of the head section. The tabs 41 are adapted to be bent over or turned into relieved grooves 42, formed in the base member, adjacent the slot, as illustrated by slot 43 of the base member shown in FIGS. 13 and 14. In this embodiment, the head section 21 of the terminal is not only swaged or deformed within the slot, but the tabs 41 are then bent over into the grooves 42 formed in the surface 11 of the base member. The tabs 41 make good electrical contact with the conductive material 14 deposited around the slot 43 and into the grooves 42. The positioning of the tabs 41 within the grooves 42 also serves to restrain movement of the terminal from the slot 43. In performing the upsetting operation, as will be seen in FIG. 15, the head section 21 is first swaged or upset by means of pressure plates 51 having a hole 52 formed therein to receive the tabs 41 while the flat surfaces of the plates 51 engage the ends of the head section 21 and upset it within the slot formed in the base member 10. After the head section 21 of the terminal member has been upset and made thicker within the slot, the tabs 41 are bent over by a suitable tool pressing them into the grooves 42 formed in the base member 10 to securely retain the terminal therein and to make good electrical contact with the conductive layer deposited therein.

FIGS. 16–18 illustrate still another embodiment of the invention in which there is provided a terminal member 55 having a head section 56 and a pin section 57 extending in the same general direction as the longitudinal axis of the head section 56. In this embodiment of the invention, the head section 56 is positioned within a slot 16 formed in the base member 10, as shown in FIG. 17, and upset therein by the use of force from pressure plates 58 to upset the head section 56 within the slot. After this operation, the head section 56 is swaged or upset within the slot 16 and the pin section 57 extends outwardly substantially normal to the surface 11 of the base member 10, as will be seen in FIG. 18.

While it is preferable to have the slot formed in a dove-tailed shape with the sides thereof diverging away from the opening, so that the opening to the slot is narrower at the edge 17 of the base member than within the slot this is not absolutely essential. As seen in FIG. 19, the slot 61 may be formed with relatively parallel sides 62, which may still retain the upset head section of the terminal member. The upsetting of the terminal head section produces a good interference fit or mechanical binding between the surfaces of the terminal and the sides of the slot 61 to retain the pin terminal member within the base 10. In the embodiment shown in FIG. 19, the relatively straight slot is provided with beveled or relieved corner 63 having conductive material 14 deposited therein to form a good electrical connection with the upset head section of a terminal member.

While the electrical connection between the upset head section, such as section 21 of FIG. 1, and the conductive layer 14 is, in most instances, very good, it may also be desirable to assure a good electrical connection by applying a solder coating or other electrically conductive coating to the upset ends of the terminal member. Solder coating 15 overlaps both the end 23 of the head section 21 and a portion of the deposited conductor 14. As will be noted in FIG. 1, the electrical connection is assured and the solder deposition also serves to strengthen the structural support of the terminal within the slot. The arrangement of the head section within the confines of a slot provides an extremely sturdy support and permits no movement of the terminal member to break the electrical connection.

What is claimed is:
1. An electrical assembly comprising:
a nonconductive base member including a pair of substantially parallel surfaces;
at least one slot formed in an edge of said base member and communicating with [said one surface] each of said surfaces thereof;
an electrically conductive material bonded to said base member in a pattern forming electrical connectors, at least one of said connectors extending substantially to an edge portion of said slot in said base member;
a terminal member having an elongated head section and a pin section extending outwardly substantially normal to said head section, said head section being positioned in said slot with said pin section protruding outwardly from said slot, said head section of said terminal member within said slot being upset and made thicker to produce a positive mechanical interference fit with the sides of said slot thereby to support said terminal member therein; and
an electrical connection between said upset head section and said electrically conductive connector along said edge portion of said slot.

2. The electrical assembly defined in claim 1 in which said slot is formed with sides diverging in a direction away from the opening in said edge of said base member.

3. The electrical assembly defined in claim 1 in which said slot is narrow at its opening in said edge of said base member and wider within said base member thereby providing a constricted opening along said edge of said base member.

4. The electrical assembly defined in claim 1 in which said electrical connection between upset head portion and said electrically conductive connector comprises a portion of said head section which is deformed against said electrically conductive connector along said edge portion of said slot.

5. The electrical assembly defined in claim 1 in which said slot has a substantially keyhole shaped cross-section.

6. The electrical assembly defined in claim 1 in which a portion of said slot adjacent the surface of said base member is relieved and said electrically conductive connector extends into said relieved portion of said slot adjacent the surface of said base member and said head section of said terminal is upset into said relieved portion of said slot to make electrical contact with said electrically conductive connector.

7. The electrical assembly defined in claim 1 in which said terminal member has a head section and a pin section extending in the same general direction as the longitudinal axis of said head section disposed in said slot, said head section of said terminal member being upset and made thicker to produce a positive mechanical interference fit with the sides of said slot thereby supporting said terminal within said slot with said pin section extending outwardly from said base member in a direction substantially normal to said surface thereof.

8. The electrical assembly defined in claim 1 in which said terminal member is T-shaped and the leg of the T-shaped member comprises the pin section of the terminal and the cross of the T-shaped member comprises the head section disposed in said slot, the cross of said T-shaped terminal being upset and made thicker to produce a positive mechanical interference fit with the sides of said slot thereby supporting said T-shaped terminal within said slot with said pin section extending outwardly through the opening of said slot.

9. The electrical assembly defined in claim 8 in which at least one end of said cross of said T-shaped terminal is provided with a V-shaped notch to form tips on opposite sides of said V-shaped notch which are bent outwardly into contact with said electrically conductive connector along said edge of said slot.

10. The electrical assembly defined in claim 8 in which said cross of said T-shaped terminal is provided with a narrower protruding shoulder which is upset against said electrically conductive connector along said edge of said slot.

11. The electrical assembly defined in claim 1 in which said electrical connection between upset head section and said electrically conductive connector comprises an electrically conductive solder material deposited over a portion of said electrically conductive connector and the exposed end of said head section.

12. An electrical assembly comprising:
a thin nonconductive base member having oppositely disposed parallel surfaces;
at least one slot formed in an edge of said base member, said slot communicating at opposite ends thereof with said opposite surfaces of said base member;
an electrically conductive material bonded to at least one surface of said base member in a pattern forming electrical connectors [between said electrical components adapted to be supported on said base member], at least one of said connectors extending substantially to an an edge portion of said slot in said base member;

a T-shaped terminal in which the leg of the T-shaped member comprises a pin section of the terminal and the cross of the T-shaped member comprises a head section of the terminal, said head section being positioned in said slot in said base, said head section having an original length greater than the thickness of said base member, said head section of said terminal member within said slot being upset [by a compressive force applied to opposite ends thereof to make said head section thicker] within said slot thereby to produce a positive mechanical interference fit with the sides of said slot for supporting said terminal member therein, at least one end portion of said head section contacting said electrically conductive connector along said edge of said slot.

13. The electrical assembly defined in claim 12 in which an electrical connection between said upset head section and said electrically conductive connector is formed by an electrically conductive solder material deposited over a portion of said electrically conductive connector and said end portion of said head section.

14. A method of making a circuit element comprising the steps of:
providing a nonconductive base member having a [substantially smooth surface] pair of substantially parallel smooth surfaces;
forming at least one slot in an edge of said base member, said slot extending to and communicating with each of said smooth surfaces;
depositing a layer of conductive material on at least one of said surfaces of said base member in a pattern forming electrical connectors thereon, at least one of said electrical connectors being deposited adjacent an edge of said slot formed in said base member;
providing a T-shaped terminal member having an elongated head section and a pin section extending outwardly from said head section;
positioning said head section of said terminal member within said slot formed in said nonconductive base member; and
applying a compressive force to opposite ends of said head section within said slot to upset said head section thereby producing a positive mechanical interference fit between said head section and the sides of said slot to support said terminal member within said slot, said compressive force also causing at least one end of said head section to be deformed into electrical contact with said electrical connector deposited adjacent an edge of said slot.

15. A method of making a circuit element defined in claim 14 in which said slot in said edge of said base member is formed in the shape of a dove-tailed slot with the sides thereof diverging in a direction away from the opening in said edge of said base member.

16. A method of making a circuit element comprising the steps of:
providing a thin nonconductive base member having a pair of flat oppositely disposed parallel surfaces;
forming at least one slot in an edge of said base member, said slot extending to and communicating with said surfaces of said base member;
depositing a layer of conductive material on at least one of said surfaces of said base member in a pattern forming electrical connectors thereon, at least one of said electrical connectors being deposited adjacent an edge of said slot formed in said edge of said base member;
providing a T-shaped terminal member having an elongated head section and a pin section extending outwardly from said head section;
positioning said head section of said terminal member within said slot formed in said nonconductive base;
applying a compressive force to opposite ends of said head section [within said slot] to upset said head section within said slot and make it thicker thereby producing a positive mechanical interference fit between said head section and the sides of said slot to support said terminal member within said slot; and
depositing a conductive material over the end of said upset head section within said slot and the portion of said conductive connector adjacent said edge of said slot to make an electrical connection between said head section of said terminal and said connector.

17. The method defined in claim 15 in which the cross of said T-shaped terminal forms a head section having a length greater than the thickness of said base member and said head section is positioned within said slot with portions thereof protruding above at least one of the surfaces of said base and said compressive force is applied to opposite ends of said head section to upset said head section within said slot and to deform at least one end of said head section so that it makes electrical contact with said conductive connector deposited adjacent said slot.

References Cited
UNITED STATES PATENTS 2,413,539   12/1946   Ballard _____ 174—68.5 XR
3,280,378   10/1966   Brady et al.
3,492,536   1/1970   Girolamo et al. __ 174—68.5 XR DARRELL L. CLAY, Primary Examiner U.S. Cl. X.R.
29—628; 317—101; 339—17, 220

PO-1050
(5/69)

UNITED STATES PATENT OFFICE
CERTIFICATE OF CORRECTION

Patent No. 3531581        Dated September 29, 1970

Inventor(s)    James R. Chesemore

It is certified that error appears in the above-identified patent and that said Letters Patent are hereby corrected as shown below:

Column 5, line 58, delete      [said one surface]

Column 6, lines 71, 72 & 73, delete      [between said electrical components adapted to be supported on said base member ]

Column 7, lines 8, 9 & 10 delete      [by a compressive force applied to opposite ends thereof to make said head section thicker]

Column 7, lines 24 & 25 delete      [substantially smooth surface]

Column 8, line 20 delete      [within said slot]

SIGNED AND SEALED
DEC 15 1970

(SEAL)
Attest:

Edward M. Fletcher, Jr.
Attesting Officer

WILLIAM E. SCHUYLER, JR.
Commissioner of Patents